United States Patent [19]

Evenson

[11] Patent Number: 5,303,780

[45] Date of Patent: Apr. 19, 1994

[54] CULTIVATOR DEFLECTOR APPARATUS AND METHODS OF MAKING AND USING SAME

[76] Inventor: Duwayne E. Evenson, R.R. #1, Minnesota Lake, Minn. 56068

[21] Appl. No.: 699,658

[22] Filed: May 14, 1991

[51] Int. Cl.⁵ .............................................. A01B 17/00
[52] U.S. Cl. .................... 172/509; 172/769; 172/508
[58] Field of Search ............... 172/509, 508, 510, 513, 172/769, 776; 403/380

[56] References Cited

U.S. PATENT DOCUMENTS

| | | | |
|---|---|---|---|
| 311,909 | 2/1885 | Miller | 172/508 |
| 412,864 | 10/1889 | Van Patten | 403/380 |
| 479,706 | 7/1892 | Dexter, Jr. | 403/380 |
| 663,494 | 12/1900 | Harris | 172/509 |
| 668,178 | 2/1901 | Harrison | 172/508 |
| 1,339,589 | 5/1920 | Taylor | 172/509 |
| 2,065,174 | 12/1936 | Dutour | 172/508 |
| 3,026,945 | 3/1962 | Tanke | 172/509 |
| 3,680,648 | 8/1972 | Tonsfeldt | 172/201 |
| 3,713,497 | 1/1973 | Hawkins | 172/509 |
| 4,133,389 | 1/1979 | Ruhl et al. | 172/41 |
| 4,213,505 | 7/1980 | Jolley | 172/510 |
| 4,781,253 | 11/1988 | Cosson | 172/508 |
| 4,828,041 | 5/1989 | Cosson | 172/509 |

FOREIGN PATENT DOCUMENTS

| | | | |
|---|---|---|---|
| 959701 | 12/1974 | Canada | 172/509 |
| 3440765 | 5/1985 | Fed. Rep. of Germany | 172/509 |

Primary Examiner—Dennis L. Taylor
Assistant Examiner—Spencer Warnick
Attorney, Agent, or Firm—Evenson, McKeown, Edwards & Lenahan

[57] ABSTRACT

A multi-row agricultural field cultivator for row crops having a row cultivator shovel sized and configured to penetrate soil adjacent a crop row to a depth of between one and three inches, a substantially flat soil deflector plate and a deflector plate attachment structure for attaching the deflector plate to the cultivator structure in a horizontal position above the local ground surface adjacent the cultivator shovel. The deflector plate downwardly deflects soil thrown up by the cultivator shovel during cultivating operations to achieve minimal crop damage at increase cultivator operating speeds.

44 Claims, 6 Drawing Sheets

CULTIVATOR DEFLECTOR APPARATUS AND METHODS OF MAKING AND USING SAME

BACKGROUND AND SUMMARY OF THE INVENTION

The present invention relates to multi-row agricultural row crop field cultivators. More specifically, the present invention relates to a soil deflector arrangement for such cultivators so as to facilitate increased speeds of cultivation.

In present day commercial agriculture, many crops are planted in rows which are spaced a predetermined distance from one another and extend parallel to one another over the length of the field or along the contour of the land. Soybeans and corn are typical crops which are planted in such rows. These row crops are cultivated with a row crop cultivator one or more times during their life cycle.

Various multi-row crop cultivators have been used to cultivate row crops for many years. The primary purpose of these row crop cultivators is to kill and destroy weeds that have begun to grow between the rows and between the individual plants in a row. These cultivators typically include cultivator shovels mounted on cultivator shanks so as to be selectively lowered into a position penetrating the soil between the crop rows. When in a lowered position, the cultivator, usually by means of a tractor carrying, pushing, or pulling the cultivator, is moved along the length of the rows and the cultivator shovels lift the top inch or two of soil with consequent destruction of weeds that have begun to grow. An added benefit of row crop cultivation is the aeration of the soil to enhance the growth and health of the crop. Row crop cultivators can include cultivator shovels which have a deeper cultivation for alleviating compaction in the soil and thereby accommodate better crop root growth.

Exemplary row crop cultivators with which the present invention could be used include commercially available Case Model 183 rear-mounted cultivators, John Deere Model 825 cultivators, and Yetter Model 4400 and 4500 cultivators.

Most cultivator shovels lift the soil in an essentially uncontrollable fashion so that the soil flies in the air and can cause damage to the row crop plants, especially when they are small. This is especially a problem when the soil is compacted such that it slides or flies off of the shovels in clods or clumps. There have been many types of cultivator shields proposed in the past for preventing the soil from damaging the crop when it is small. Most of these shields utilize vertically extending shield members which prevent lateral movement of the soil that is lifted by the cultivator shovels, so that the soil cannot laterally move to damage the adjacent crop row. There have also been cultivator shield arrangements which include an essentially U-shaped arrangement with vertical side shields and top shields extending adjacent and over the top of the cultivator shovel. U.S. Pat. No. 3,680,648 to Tonsfeldt is an example of a cultivator with such a combination vertical side shield and top shield arrangement.

There have also been horizontal shield arrangements proposed for deep tilling soil ripping implements such as disclosed in U.S. Pat. Nos. 4,781,253 and 4,828,041 to Cosson. These shield arrangements for the deep tilling arrangements are designed to be located very close to the soil during use and include suggestions regarding actually serving to contact the soil so as to guide the loosened soil around the base of growing crops in the rows. These shields are constructed with multiple parts for each depending shank supporting a deep tilling implement.

U.S. Pat. No. 2,065,174 to Dutour describes an earth dirt stop for cultivator shovels which is adjustably movable from a position laterally of a cultivator shovel to a position directly above and in front of a cultivator shovel. This earth stop is specifically designed to prevent dirt from riding high and over the shovels and is apparently not concerned with the high speed cultivating arrangements of modern day agriculture wherein the cultivator shovels are sized and configured so that the soil actually flies upward above the cultivator shovels.

U.S. Pat. No. 311,909 to Miller discloses a plow fender which is to be disposed at one side of a plow and is designed to control the earth as it leaves the plow and to also hill the crop, forcing the earth into hills around the plants during cultivating operations. Thus, this arrangement is not concerned with the high speed modern cultivators contemplated by the present invention wherein the cultivator shovels are causing the soil to fly upwardly as the cultivator moves along the crop row.

The present invention is related to a cultivator arrangement for a multi-row agriculture field cultivator which has cultivator shovels which in use will cause upward flying movement of soil as the cultivator moves along the crop rows. More specifically, the present invention is related to an improved soil deflector arrangement which permits in a very simple and economical manner, a substantial increase in the cultivator speeds that can be achieved with such cultivators. Thus, a first important object of the present invention is to provide a soil deflector arrangement for cultivators which controls the flying soil in a simple manner so as to facilitate substantial increases in cultivating speeds without requiring further modifications of the cultivator equipment.

Another object of the present invention is to provide a soil deflector arrangement for cultivators which can be easily retrofitted to existing commercial cultivators.

Another object of the present invention is to provide a soil deflector arrangement for cultivators which is sturdy and reliable and still very economical to produce and install on multi-row cultivator equipment.

Another object of the present invention is to provide a soil deflector arrangement which minimizes adherence of the soil to the deflector and maximizes the life of the deflector with respect to abrasion caused by the flying soil continuously impacting against the deflector.

According to the invention, these and other objects are achieved by providing a deflector arrangement for cultivators of the type having cultivator shovels which cause upward flying movement of soil as the cultivator moves along the crop rows during cultivating operations. The deflector arrangement includes a deflector plate disposed above the cultivator shovel at a position above the local ground surface level during cultivating operations. The deflector plate deflects the flying soil thrown up by the cultivator shovel in especially preferred embodiments because it completely surrounds the shank and thereby deflects most, if not all, soil flowing upward and forces the soil to stay near local ground level. This allows for substantially increased cultivator operating speeds as compared to similar cultivators without the deflector plates.

It should be understood that the deflector plates of the present invention are not intended to replace the rolling shields and other vertical shields conventionally now available on most row crop cultivators. These deflector plates of the present invention are intended to supplement and enhance such conventional arrangements and facilitate higher cultivator speeds.

According to especially preferred embodiments of the invention, the deflector plate is constructed as a single solid unitary substantially flat plate for each of the respective cultivator shovels. By providing a unitary flat plate, the manufacturing costs are minimized, the installation steps required for installing the deflector plate on a cultivator shank are simplified, and a durable dimensionally stable deflector plate can be manufactured with reliable repeatability. In especially preferred embodiments, the deflector plate is simply made of a non-metallic material, preferably a plastic material with surface characteristics preventing adhesion of soil during operation.

According to especially preferred embodiments, the deflector plates are single circular pieces of plastic material which each have an aperture in the middle for accommodating a cultivator shank to which the plate is attached by a simple L-bracket bolted to the plate via through bolts and via a U-bolt to the shank. This construction is not only very economical and simple to manufacture, it is also very simple to reliably attach at the cultivator and to adjust at the cultivator.

Other preferred embodiments are contemplated wherein the deflector plate is formed by injection molding of plastic. In certain preferred embodiments, the deflector plate and attachment bracket for attaching to the cultivator shank are formed as two parts which fit together to form a deflector plate structure surrounding the cultivator shank.

In especially preferred contemplated embodiments, the deflector plates are inclined at an angle up to 20° and preferably 5° to 10° with respect to the local horizontal, when in the in-use position during cultivating operations, with the front end being higher than the rear end. This inclination of the deflector plates assures that the front or leading edge goes over the top of existing rocks and dirt clumps in the field, while also providing a controlled smoothing of the soil being deflected and distributed between crop rows behind the associated cultivator shovel.

According to preferred embodiments, with multi-row cultivators having different size shovels, correspondingly different sized deflecting plates are provided for each of the shovels.

Other objects, advantages and novel features of the present invention will become apparent from the following detailed description of the invention when considered in conjunction with the accompanying drawings.

DETAILED DESCRIPTION OF THE DRAWINGS

Figure 1:
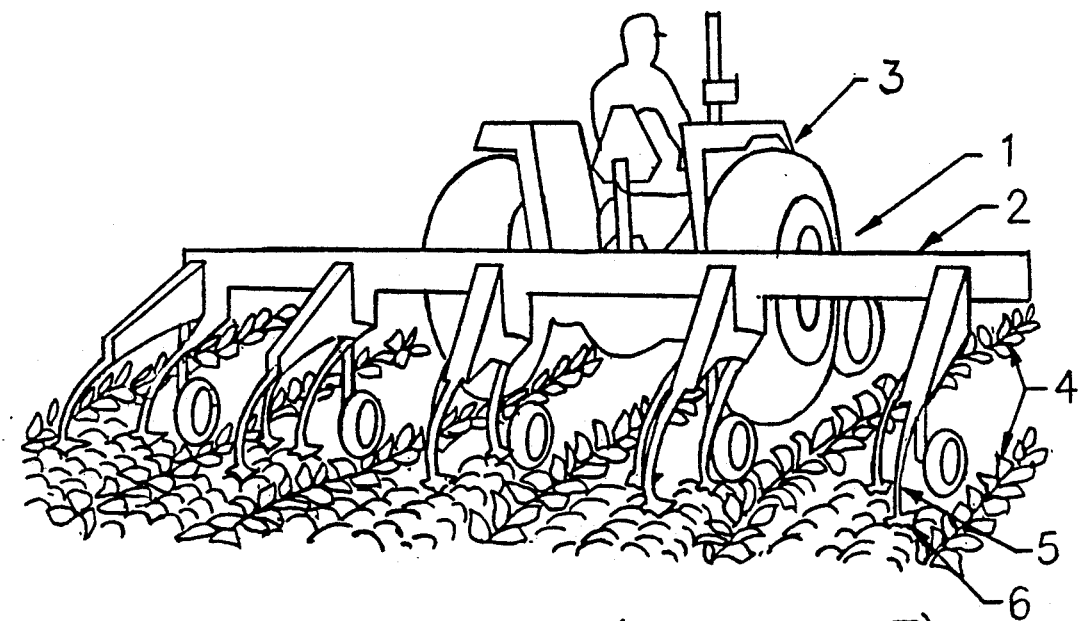
FIG. 1 is a schematic perspective view of a tractor pulling a cultivator constructed according to the prior art.

FIG. 1 schematically depicts a prior art row crop field cultivator arrangement which the present invention is designed to improve. The cultivator 1 of FIG. 1 includes a support frame 2 which is connected to a tractor 3 by way of a three-point hitch. The tractor 3 includes a hydraulic system for forcibly raising and lowering the cultivator assembly between a transport non-cultivating position and a cultivating position penetrating the soil between crop rows 4. Between each pair of crop rows 4, the cultivator includes a plurality of cultivator shank and shovel assemblies which each have a shank 5 carried by the cultivator frame and a cultivator shovel 6 attached at the bottom thereof. During operation of this prior art cultivator arrangement of FIG. 1, the speed of operation is limited, especially with cultivation of newly emerging small plants on the occasion of a first cultivation, because increased speeds cause soil to fly up and hit the row crop plants, damaging them. This problem is accentuated in those areas where the tractor wheels travel between the rows due to the compaction of the soil and the tendency of the cultivator shovels to then dislodge chunks or clumps of soil that then fly in an uncontrollable manner and hit the emerging row crop plants.

Figure 2:
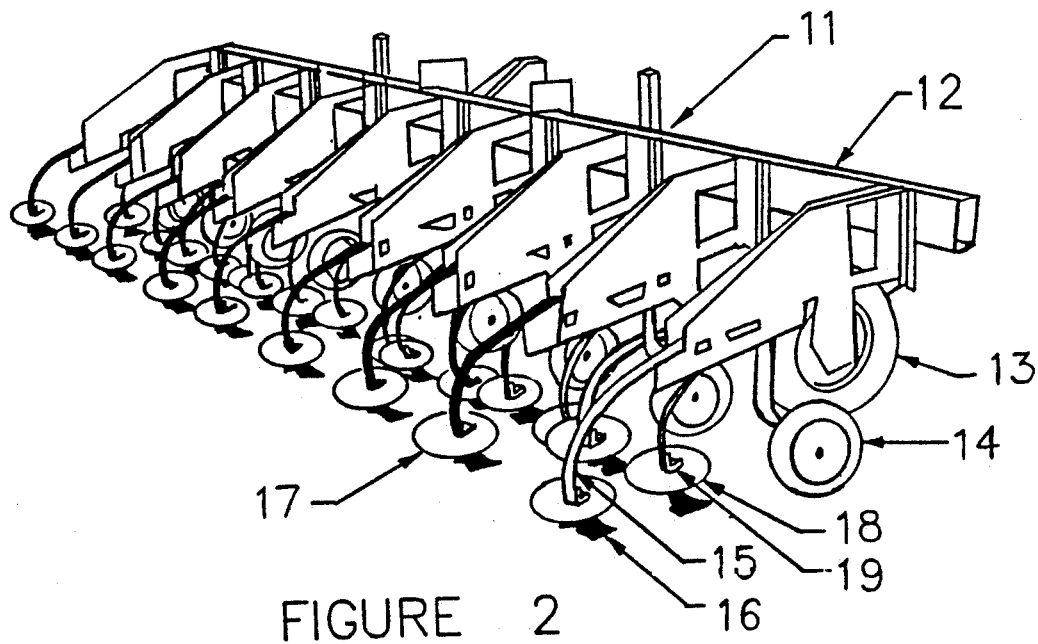
FIG. 2 is a schematic perspective view of an eight-row cultivator, including deflector plates, constructed in accordance with a preferred embodiment of the present invention.
Figure 3:
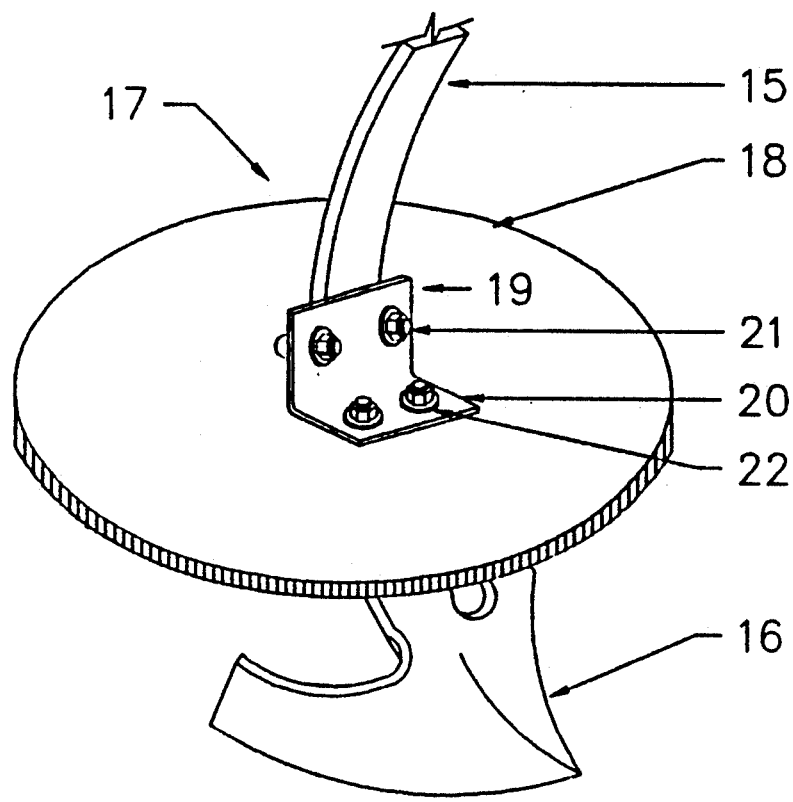
FIG. 3 is an enlarged schematic perspective view showing a single cultivator shank and shovel assembly with a deflector plate constructed according to a preferred embodiment of the invention.

FIG. 2 is a perspective view of an eight-row cultivator 11, constructed in accordance with a preferred embodiment of the present invention. Cultivator 11 includes a support frame 12 which is connectable with a three-point hitch on a tractor for controlling movement thereof between cultivating and transport positions. Transport wheels 13 support the cultivator during in-use and non-cultivating transport positions, with the three-point hitch arrangement being operable to pivot the cultivator assembly around these support wheels 13. Gage wheels 14 are provided between respective crop rows and serve to maintain a cultivating depth by individually supporting the respective gangs of cultivator shanks 15 and attached cultivator shovels or sweeps 16. These above-discussed features 12 to 16 are representative of exemplary prior art cultivator constructions of the type the present invention is directed at improving.

The improved cultivator of the present invention includes deflector plate assemblies schematically depicted in FIG. 2. FIGS. 3–6 are enlarged schematic views which depict details of one of the deflector plate assemblies 17 of the cultivator of FIG. 2.

Each of the cultivator shank and shovel assemblies 15, 16 is provided with a deflector plate assembly 17 which includes a deflector plate 18 and an attachment bracket assembly 19 for attaching the deflector plate to the cultivator shank 15. The bracket assembly 19 includes a substantially L-shaped bracket member 20, a U-bolt 21 for attaching the upright leg of the bracket member 20 to the shank 15 in an adjustable manner and a pair of bolts 22 for attaching the lower leg of the bracket member 20 to the deflector plate 18.

Figure 4:
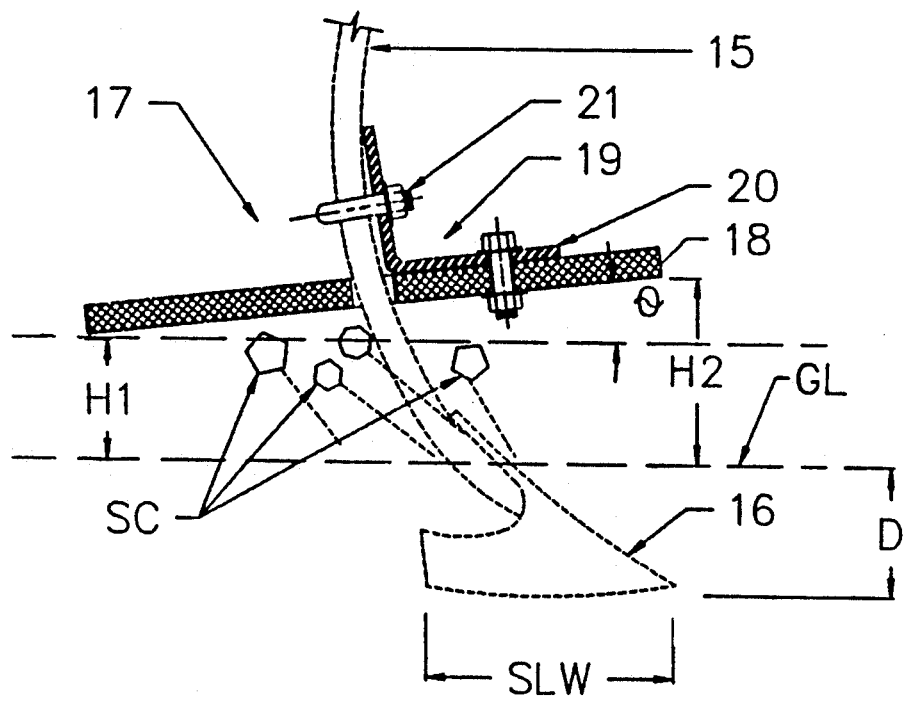
FIG. 4 is a schematic sectional side view of the assembly of FIG. 3, depicted in an in-use cultivating position.

FIG. 4 schematically depicts a cultivator shank and shovel assembly 15, 16, with attached deflector plate assembly 17 when in an in-use cultivating position with the shovel 16 penetrating the soil. The bottom tip of the shovel 16 penetrates the soil to a distance D of approximately 1 to 3 inches below the local ground level GL in operation. The cultivator shovel 16 causes soil to fly up, including soil clumps SC, which are then deflected downwardly by the deflector plate 18 so as to controllably confine the movement of the soil with these clumps SC and thereby permit increased cultivator speeds without damage to the row crop plants.

The deflector plate 18 is inclined at an angle $\theta$ with the forward end of the plate at a higher elevation H2 than the elevation H1 of the rear side of the plate. In particularly preferred embodiments, the angle of inclination $\theta$ of the plate 18 with respect to the local horizontal ground surface ("H") is up to 20°, and preferably in the range of 5° to 10°. The plate 18 is mounted on the shank 15 so that the rear elevation H1 is at least 2 to 4 inches, and preferably in the range of 4 to 8 inches, depending upon the particular soil involved and the size of the deflector plate and cultivator shovels. The inclination of the deflector plate provides for clearance of the ground at the front end during high speed cultivation and accommodates inherent fluctuations in cultivator shovel penetration depth and variations in local ground surface conditions, including preexisting clumps of soil thereon, with the lower disposition of the rear end of the deflector plate serving to control and smooth out the flow of soil clods SC and loose soil between the crop rows without damaging the crop plants.

Figure 5:
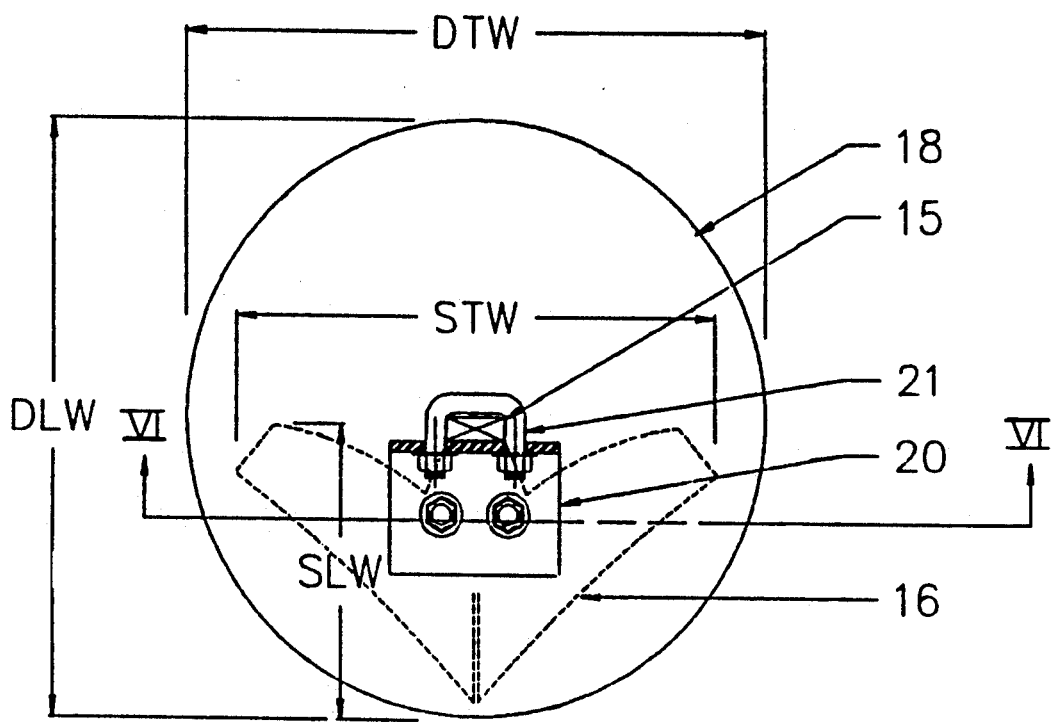
FIG. 5 is a top plan view of the assembly of FIGS. 3 and 4.
Figure 6:
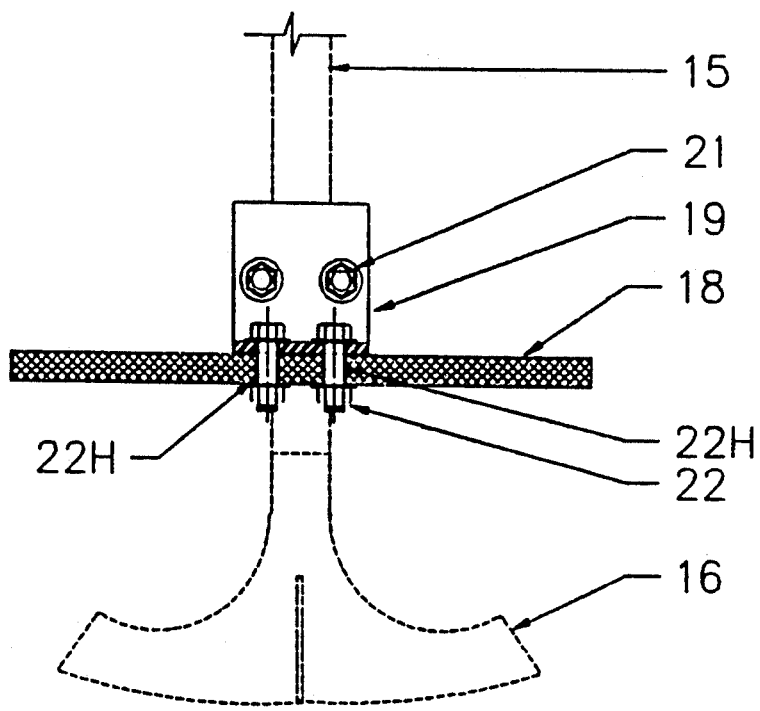
FIG. 6 is a schematic sectional view taken along the line VI—VI of FIG. 5.

FIG. 5 schematically depicts the relative sizes of the deflector plate 18 and the cultivator shovel 16. The deflector plate transverse width DTW is preferably at least as wide as the shovel transverse width STW, and, in most cases, preferably in the range of 5 to 20 percent greater than said shovel transverse width STW for a full sweep shovel as depicted in FIG. 5. For half sweeps such as shovels 16F in FIG. 7, the deflector plate would have a relatively wider transverse dimension because of the cut-off part of the sweeps at the crop row side. The deflector plate longitudinal width DLW is preferably between 1 and 2 times the operative effective shovel longitudinal width SLW.

Figure 7:
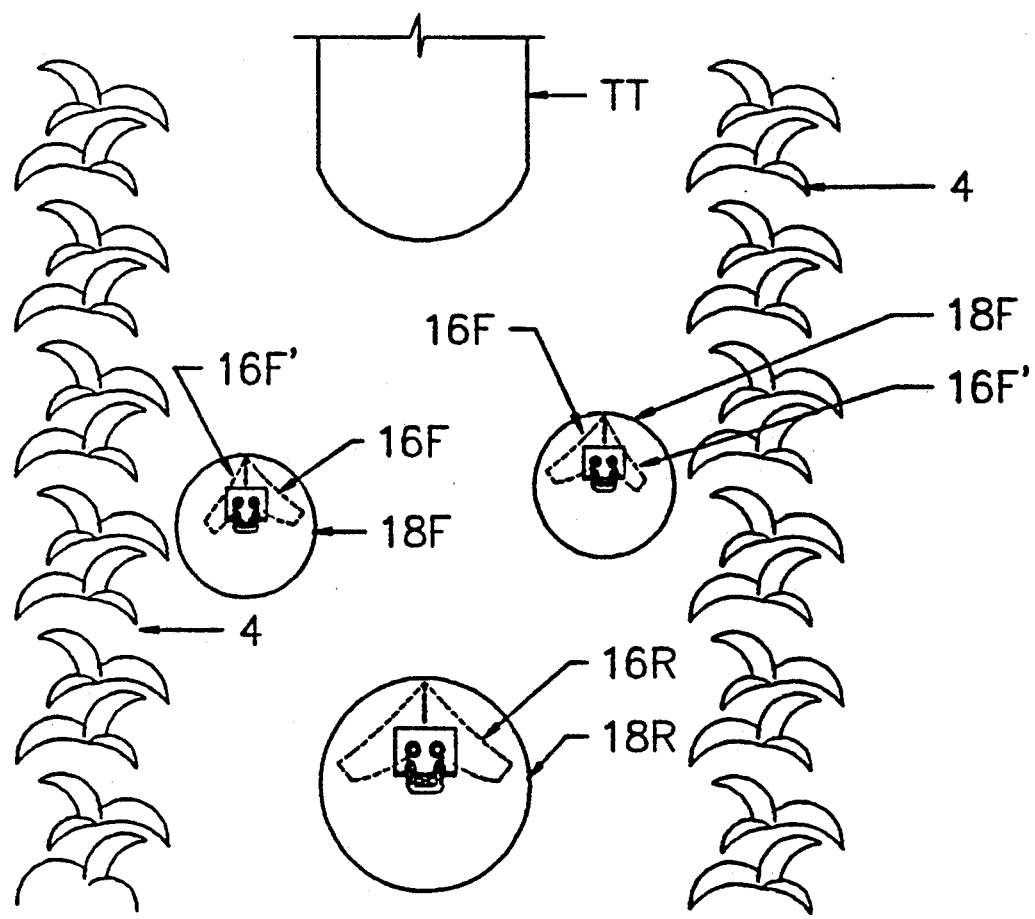
FIG. 7 is a schematic top view illustrating the disposition of a plurality of cultivator shank/shovel assemblies with deflector plates mounted thereon, in accordance with a preferred embodiment of the present invention.
Figures 8A, 8B, 8C, 8D:
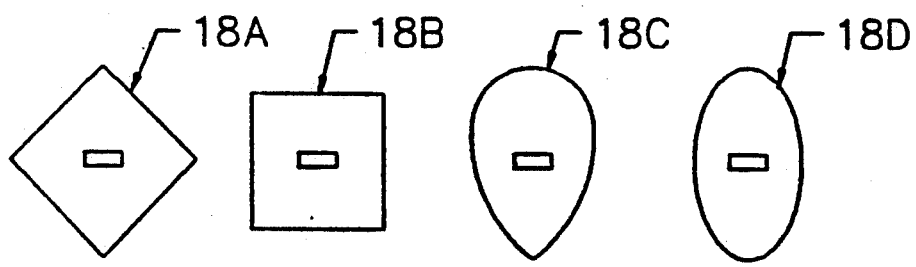
FIGS. 8A-8D schematically depict plan views of respective different deflector plate shapes according to respective preferred embodiments of the present invention.

FIG. 7 schematically depicts the plan view of cultivator shovels and deflector plates for a cultivator having three cultivator shoes disposed between two crop rows 4 during operation, with a typical 30" crop row spacing. The most forward cultivator shovels 16F have their sides facing the crop row cut-away at 16F' so that their effective shovel transverse width STW is reduced as compared to symmetrical shovel arrangements. These forward shovels 16F are also slightly smaller than the rear shovel 16R. The most rearward shovel 16R is disposed in the middle between the rows 4 and is larger than the other shovels 16F. The deflector plates 18F and 18R are correspondingly dimensioned differently, with increasing size from front to rear or from smaller cultivator shovels to larger cultivator shovels. In a typical installation having forward cultivator shovel 16F with a cultivator sweep transverse width STW of 5 to 6 inches, the deflector transverse width DTW of the deflectors 18F is approximately 6 to 8 inches. For the rear most and largest cultivator shovel 16R, having a shovel transverse width STW of 10 to 12 inches, the deflector plate 18R has a deflector transverse width DTW of approximately 14 inches. In the FIG. 7 embodiment, a tractor tire TT is depicted, resulting in that the soil is more compacted than between other sets of crop rows, a condition which makes it more desirable to have at least the rear shovel 16R and associated deflector plate 18R of a larger dimension. The deflector plate 18R serves to deflect packed dirt slabs or clods which are larger than would be the case if the tractor wheel had not preceded the cultivator assembly. Embodiments are contemplated where only the large rear shovels 16R behind the tractor tires are provided with a deflector plate, thus maximizing effectiveness with a minimum of expense.

The preferred embodiments described above with respect to FIGS. 3 to 7 relate to deflector plates having a flat circular disc construction. The deflector plates 18 are made of "Tyvar" plastic sheet material having a thickness of ¼ inch, with the plastic being cut out from these sheets to form individual circular discs preferred embodiments include discs made of TYVAR 100 which has surface characteristics preventing adhesion of soil thereto. The discs are than provided with a centrally disposed opening to match the cross-section of the cultivator shank 15 with a small play to accommodate for tolerance variation and to accommodate vertical adjustment along the shank 15 and holes 22H are drilled for accommodating the bolts 22. Also during the cutting operation, or subsequent thereto, a bevel could be provided at what will be the underside of the deflector plate 18 when it is put into position on a cultivator shank 15, according to certain unillustrated preferred embodiments. The U-bolt clamp 21 is a 5/16 inch diameter steel U-bolt and the bolts 22 are steel 5/16 inch bolts. The angled bracket 20 is formed of mild steel with a thickness of ⅛ inch, which is sufficiently strong yet malleable enough to accommodate bending to adjust the angle of inclination $\theta$ of the plate 18 when it is assembled on a shank 15. The legs of the bracket 20 are 4" to 6" long and preferably at least 5" long on the deflector plate side so as to provide a stable backing support for the deflector plate. The U-bolt 21 accommodates adjustment of the vertical height of the plate for different stages and kinds of crop being cultivated, as well as different soil conditions and cultivator shoe configurations.

FIGS. 8A–8D schematically depict different cross-sectional planar shapes for deflector plates 18A–18D, constructed according to other contemplated embodiments of the invention. The location of the central opening for the shank and the relative dimensions of the cultivator shovel and deflector plate are analogous to the FIG. 5 illustration insofar as relative widths in the transverse longitudinal direction are concerned.

Figures 9A, 9B, 9C:
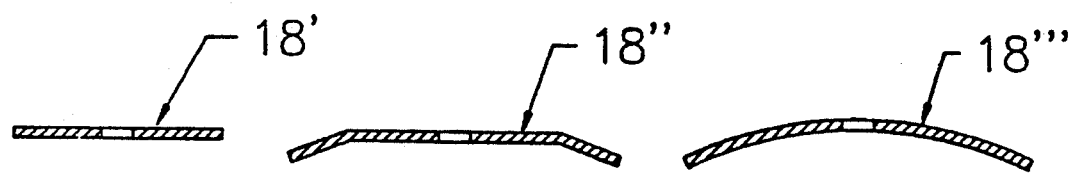
FIGS. 9A-9C show respective different shaped deflector plates in cross-section, constructed according to preferred embodiments of the invention.

FIG. 9A schematically depicts the flat plate construction of the embodiment of FIGS. 1-7.

FIG. 9B schematically depicts a modified preferred embodiment which includes a flat central section and downwardly protruding edge sections E.

FIG. 9C depicts a cross-section of deflector plate embodiments with a slightly downwardly curved shape.

Figures 10A, 10B, 10C:
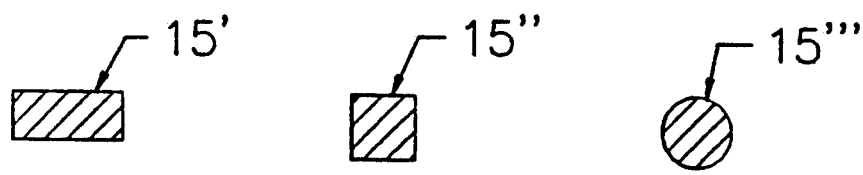
FIGS. 10A-10C schematically depict respective cross-sections of cultivator shank types with which the present invention deflector plates can be utilized.

FIGS. 10A-10C depict different cross-section shapes of cultivator shanks 15', 15'', 15'' with which the deflector plates 18-18D could be used according to different contemplated embodiments of the invention.

Figure 11:
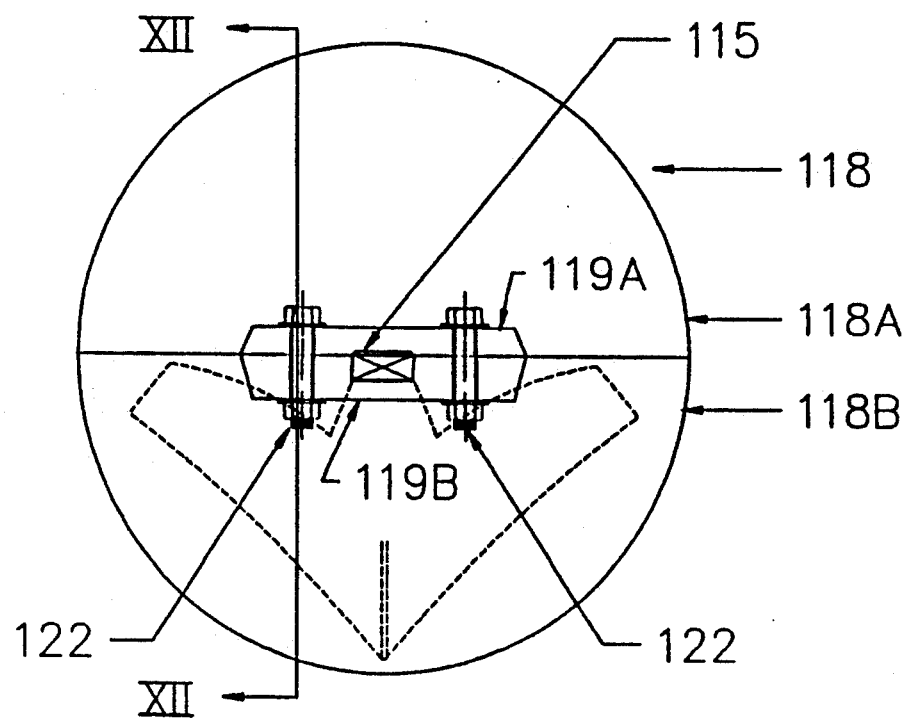
FIG. 11 is a top plan view showing another preferred embodiment manufactured by an injection molding process.
Figure 12:
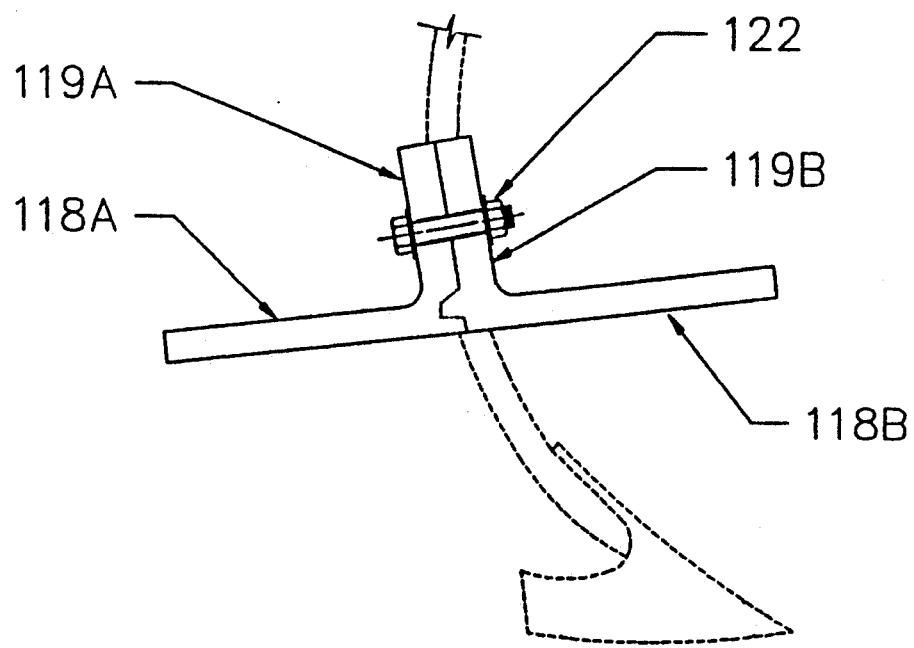
FIG. 12 is a sectional view taken along the line XII—XII of FIG. 11.

FIGS. 11 and 12 depict an alternative embodiment. FIG. 11 is a top plan view showing a preferred embodiment which is designed to be manufactured by an injection molding process. The deflector plate 118 is formed by injection molding plastic into two "halves" or parts 118A and 118B. These parts 118A and 118B include integrally formed plate members 119A and 119B which are inclined with respect to the adjacent flat portion of the deflector plate parts 118A and 118B so as to accommodate a predetermined inclination $\theta$ (compare FIG. 4) of the deflector plate 118 when attached to the cultivator shank 115 in use. These plate members 119A and 119B include apertures for accommodating clamping bolts 122. Also the facing edges 118E and 118E' are configured with respective mating groove and tongue configurations to assure precise alignment when installed on a cultivator shank. The embodiment of FIGS. 11 and 12 is particularly easy to install on a cultivator since neither the shovels nor the cultivator shank need be disassembled. The two parts 118 and 119 can simply be clamped by the bolts 122 to the desired location on the shank 115. Alternative embodiments are contemplated where instead of bolts 122, other detachable clamps are provided.

Since the two parts 118A and 118B are made by plastic injection molding, changes in die molds can accommodate changes in shapes and sizes of the deflector plates. For example, this molding process could be used for deflector plates having shapes corresponding to FIGS. 8-10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A multi-row agricultural field cultivator for row crops comprising:
   at least one cultivator shovel sized and configured to penetrate the soil adjacent a crop row to a depth of between 1 and 3 inches with consequent upward flying movement of soil as the cultivator moves along the crop row during cultivating operations,
   a substantially flat soil deflector plate,
   and deflector plate attachment structure for attaching the deflector plate in a substantially horizontal position to cultivator structure at a position above the local ground surface level adjacent the cultivator shovel so that the deflector plate downwardly deflects flying soil thrown up by the cultivator shovel during cultivating operations to facilitate increased cultivator operating speeds with minimal crop damage caused by the flying soil at the increased cultivator operating speeds wherein said deflector plate exhibits an in-use operative soil deflecting surface which extends substantially farther at the rearward side of the cultivator shovel than at the forward side of the shovel.

2. A cultivator according to claim 1, wherein said deflector plate has a length which is one to two times the length of the axial length of the cultivator shovel in the travelling direction of the cultivator during cultivating operations.

3. A cultivator according to claim 1, wherein said deflector plate extends forwardly and rearwardly of the axial length of the cultivator shovel in the travelling directions of the cultivator during cultivating operation.

4. A cultivator according to claim 1, wherein said deflector plate is a solid unitary substantially flat plate.

5. A cultivator according to claim 1, wherein said deflector plate is made of non-metallic material.

6. A cultivator according to claim 1, wherein said deflector plate is made of plastic material with surface characteristics preventing adhesion to soil during cultivating operations.

7. A cultivator according to claim 4, wherein said deflector plate includes a through aperture for accommodating protrusion therethrough of a cultivator shank supporting the cultivator shovel when in an installed condition on a cultivator.

8. A cultivator according to claim 7, wherein said deflector plate is made of plastic material with a surface characteristic preventing adhesion to soil during operation.

9. A cultivator according to claim 8, wherein said deflector plate is made of TYVAR 100 poly plastic material.

10. A cultivator according to claim 4, wherein said deflector plate is circular in shape.

11. A cultivator according to claim 10, wherein said deflector plate includes a through aperture for accommodating protrusion therethrough of a cultivator shank supporting the cultivator shovel when in an installed condition on a cultivator.

12. A cultivator according to claim 11, wherein said aperture is disposed in the center of the deflector plate.

13. A cultivator according to claim 5, wherein said deflector plate attachment structure includes a detachable clamp for detachably clamping the plate to a cultivator shank supporting the cultivator shovel when in installed condition on the cultivator.

14. A cultivator according to claim 13, wherein said detachable clamp includes threaded clamping means.

15. A cultivator according to claim 13, wherein said detachable clamp includes means for accommodating vertical adjustment of the plate with respect to the cultivator shovel.

16. A cultivator according to claim 13, wherein said deflector plate attachment structure includes a bracket member having a first bracket portion clampingly engageable with a top surface of the plate and a second bracket portion clampingly engageable with a cultivator shank when in an in-use operating position on the cultivator.

17. A cultivator according to claim 16, wherein said bracket member is an L-shaped metal bracket, wherein threaded bolt means extend through the first bracket portion and the deflector plate to claim the deflector plate to the bracket, and wherein further threaded bolt means extend through the second bracket portion to clamp the bracket to the cultivator shank.

18. A cultivator according to claim 17, wherein the further threaded bolt means is a U-bolt having a bridge portion engaging one side of the cultivator shank and leg portions extending along opposite sides of the shank and through openings in the second bracket portion.

19. A cultivator according to claim 18, wherein said deflector plate includes a through aperture for accommodating protrusion therethrough of a cultivator shank supporting the cultivator shovel when in an installed condition on a cultivator.

20. A cultivator according to claim 19, wherein said deflector plate is made of plastic material with surface characteristic preventing adhesion to soil during operation.

21. A cultivator according to claim 20, wherein said deflector plate is circular in shape and said through aperture is disposed in the center of the plate.

22. A cultivator according to claim 1 wherein one of said deflector plates for each cultivator shovel of the cultivator.

23. A cultivator according to claim 1, wherein different size cultivator shovels are provided, and wherein each different size cultivator shovel is provided with a corresponding different sized one of said deflector plates.

24. A cultivator according to claim 1, wherein said deflector plate exhibits a substantially planar flat bottom which is included at an angle of between 5° and 10° with respect to a plane extending parallel to local ground surface when in use during cultivator operations.

25. A cultivator according to claim 1, wherein said at least one cultivator shovel includes two cultivator shovels disposed respectively between crop rows at positions preceded by a tractor tire of a tractor transporting the cultivator during cultivator operation, and wherein one of said deflector plates is provided for each of said two cultivator shovels.

26. A cultivator according to claim 25, wherein said two cultivator shovels are the only ones provided with said deflector plates.

27. A cultivator according to claim 1, wherein said cultivator is provided with rolling shields which are separate from the deflector plate.

28. A cultivator according to claim 1, wherein said cultivator is provided with vertical shields which are separate from the deflector plate.

29. A cultivator according to claim 1, wherein said cultivator is provided with vertical shields which are separate from the deflector plate.

30. A cultivator according to claim 1, wherein said deflector plate includes first and second separately made plastic injection molded deflector plate parts which includes interengageable alignment devices for aligning the first and second parts with one another when attached by the attachment apparatus to the cultivator shank.

31. A cultivator according to claim 30, wherein each of said first and second parts includes a downwardly facing substantially flat surface which is impinged upon by flying soil during cultivating operations.

32. A cultivator claim 31, wherein each of said first and second parts include integrally formed attachment flanges extending upwardly from the deflector plate, and wherein said attachment apparatus includes at least one clamping bolt for clamping said flanges together.

33. A cultivator according to claim 30, wherein said interengageable alignment devices form a tongue and groove connector.

34. A deflector plate arrangement for a multi-row agricultural field cultivator for row crops of the type having at least one cultivator shovel sized and configured to penetrate the soil adjacent a crop row with consequent upward flying movement of soil as the cultivator moves along the crop row during cultivating operations, said deflector plate arrangement comprising:
a substantially flat soil deflector plate,
and deflector plate attachment structure for attaching the deflector plate in a substantially horizontal position to cultivator structure at a position above the local ground surface level adjacent the cultivator shovel so that the deflector plate downward deflects flying soil thrown up by the cultivator shovel during cultivating operations to facilitate increased cultivator operating speeds with minimal crop damage caused by the flying soil at the increased cultivator operating speeds,
wherein said deflector plate and deflector plate attachment structure are configured and disposed with respect to one another such that, when the deflector plate is in an in-use position, the deflector plate extends in a forward travel direction of the cultivator from a front-end position spaced a first distance forwardly of a forward most end of the cultivator shovel to a rear-end position spaced a second distance rearward of a rearward most end of the cultivator shovel, said second distance being substantially greater than said first distance.

35. A deflector plate arrangement according to claim 34, wherein said deflector plate is a solid substantially flat plate made of non-metallic material with surface characteristics preventing adhesion to soil during cultivating operations.

36. A deflector plate arrangement according to claim 35, wherein said deflector plate is a circular plate made of plastic material.

37. A deflector plate arrangement according to claim 36, wherein said deflector plate is a unitary flat plate made of plastic material.

38. A deflector plate arrangement according to claim 37, wherein said deflector plate includes a through aperture for accommodating protrusion therethrough a of a cultivator shank supporting the cultivator shovel when in an installed condition on a cultivator.

39. A deflector plate arrangement according to claim 38, wherein said deflector plate is made of TYVAR 100 poly plastic material.

40. A deflector plate arrangement according to claim 35, wherein said deflector plate is made of plastic material.

41. A deflector plate arrangement according to claim 35, wherein said deflector plate includes first and second separately made plastic injection molded deflector plate parts which includes interengageable alignment devices for aligning the first and second parts with one another when attached by attachment apparatus to the cultivator shank.

42. A deflector plate arrangement according to claim 41, wherein each of said first and second parts includes a downwardly facing substantially flat surface which is impinged upon by flying soil during cultivating operations.

43. A deflector plate arrangement according to claim 42, wherein each of said first and second parts include integrally formed attachment flanges extending upwardly from the deflector plate, and wherein said attachment apparatus includes at least one clamping bolt for clamping said flanges together.

44. A deflector plate arrangement according to claim 42, wherein said interengageable alignment devices form a tongue and groove connector.

* * * * *